(12) United States Patent
Carlden (10) Patent No.: US 11,338,864 B2
(45) Date of Patent: May 24, 2022

(54) VEHICLE BODY MODULE CONNECTING JOINT

(71) Applicant: VOLVO TRUCK CORPORATION, Gothenburg (SE)

(72) Inventor: Lars Carlden, Alafors (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 300 days.

(21) Appl. No.: 16/617,456

(22) PCT Filed: Jun. 14, 2017

(86) PCT No.: PCT/EP2017/064622
§ 371 (c)(1),
(2) Date: Nov. 26, 2019

(87) PCT Pub. No.: WO2018/228688
PCT Pub. Date: Dec. 20, 2018

(65) Prior Publication Data
US 2020/0164930 A1 May 28, 2020

(51) Int. Cl.
*B62D 31/02* (2006.01)
*B62D 27/02* (2006.01)
*B62D 63/02* (2006.01)

(52) U.S. Cl.
CPC ......... *B62D 31/025* (2013.01); *B62D 27/023* (2013.01); *B62D 63/025* (2013.01)

(58) Field of Classification Search
CPC ...... B62D 31/025; B62D 31/02; B62D 31/00; B62D 27/023; B62D 27/02; B62D 27/00; B62D 63/025; B62D 63/02; B62D 63/00
See application file for complete search history.

(56) References Cited

U.S. PATENT DOCUMENTS

| 4,469,369 A | 9/1984 | Belik et al. |
| 2008/0169677 A1* | 7/2008 | Hedderly ............... B60J 5/0455 296/187.03 |

FOREIGN PATENT DOCUMENTS

| CA | 2562444 A1 * | 4/2007 | ............... B60P 3/34 |
| CN | 203318539 U | 12/2013 | |

(Continued)

OTHER PUBLICATIONS

International Search Report and Written Opinion dated May 15, 2018 in corresponding International PCT Application No. PCT/EP2017/064622, 9 pages.

(Continued)

*Primary Examiner* — Lori L Lyjak
(74) *Attorney, Agent, or Firm* — Venable LLP; Jeffri A. Kaminski (57) ABSTRACT

A vehicle body module connecting joint for connecting a first body module to a second body module. Elongate profiles are arranged along facing edges of the first and second body modules, respectively. The profiles are clamped together by locking wedges arranged parallel to the profiles and connected by fastening means extending between facing profiles on the first and second body modules. The connecting joint includes a first profile arranged along a side edge of a first body module along a surface remote from the connecting joint and a second profile arranged parallel to and in form-fitting contact with the first profile along facing side surfaces. The assembled first and second profiles forming a single first dovetail section along a surface facing the connecting joint.

16 Claims, 7 Drawing Sheets

(56) References Cited

FOREIGN PATENT DOCUMENTS

| | | | |
|---|---|---|---|
| CN | 106005047 A | 10/2016 | |
| DE | 29519372 U1 | 3/1996 | |
| EP | 0818373 A2 | 1/1998 | |
| EP | 1931494 A1 | 6/2008 | |
| FR | 2828914 A1 | 2/2003 | |
| WO | WO-2005095192 A1 * | 10/2005 | ........... B62D 29/046 |

OTHER PUBLICATIONS

China Office Action dated Oct. 9, 2021 in corresponding China Patent Application No. 201780091190.4, 10 pages.

* cited by examiner

VEHICLE BODY MODULE CONNECTING JOINT

CROSS-REFERENCE TO RELATED APPLICATIONS

This application is a U.S. National Stage application of PCT/EP2017/064622, filed Jun. 14, 2017 and published on Dec. 20, 2018 as WO2018/228688, all of which is hereby incorporated by reference in its entirety.

TECHNICAL FIELD

The invention relates to a vehicle body module connecting joint for connecting a first body module on a first vehicle module to a second body module on a second vehicle module, during assembly of a vehicle comprising multiple connected vehicle modules.

BACKGROUND OF THE INVENTION

In the production of passenger transport vehicles or commercial vehicles in general there is a desire to produce several versions of such vehicle based on the same basic layout. The different versions can have different lengths, passenger capacity and/or load-carrying capacity. Typical examples of such vehicles are buses of an original single-unit structure based on chassis units of trucks. However, the principle is also applicable to trucks, for instance when assembling different sizes of drivers cabs or load carrying compartments.

U.S. Pat. No. 4,469,369 shows examples of module elements used for the assembly of a city motor bus or similar vehicle. In this case, a module comprising a transverse window section of the body open at the end portions is assembled end to end with adjacent modules comprising front and rear modules to form a complete vehicle. Such design makes it possible to assemble bodies of different lengths in the same assembly jig and to widely apply automatic welding.

EP0818373 shows an alternative method of assembling module elements, wherein welding can be replaced by a joint comprising locking wedges and fasteners for clamping facing edges of two modules together. In a vehicle assembled from such module elements, the parts and assemblies of the vehicle body can be assembled and subsequently replaced if necessary.

A problem with the above solutions is that vehicle modules can comprise different types of body modules having different dimensions, depending on factors such as the type of vehicle module and its location in different versions of an assembled vehicle.

The object of the invention is to provide an improved connecting joint for joining vehicle modules comprising body modules of different types or versions that solves the above problems and facilitates the assembly of such vehicle modules.

INVENTION

The above problems have been solved by a method as claimed in the appended claims.

In the subsequent text, the term "vehicle module" is intended to describe an individual vehicle module that can be connected to at least one other vehicle module. Two or more vehicle modules are assembled to make a complete vehicle. In the case of a passenger transport vehicle, such as a bus, vehicle modules can comprise a front driver's cab module, a rear drive module, and one or more intermediate passenger compartment modules having window and/or doors. Each vehicle module comprises an upper section, a lower section and two side sections connectable to corresponding sections on an adjacent vehicle module. These sections will be referred to as "body modules". When assembled, body modules making up a roof, a floor and two side walls will form a vehicle module.

A vehicle body module connecting joint can be used for connecting one or more body modules making up a first vehicle module to corresponding one or more body modules of a second vehicle module when assembling two vehicle modules. When assembling two vehicle modules, adjacent body modules of the upper sections, lower sections and side sections of the vehicle modules will be joined at the same time. The invention relates to one such joint between adjacent body module sections. In the subsequent text, the body module connecting joint described to is a generic joint suitable for use in any one of the upper sections, lower sections and side sections to be joined.

A pair of assembled body modules according to the invention can be arranged to form a portion of a side wall section, a roof or ceiling section and/or a floor section. Consequently, the assembled body modules will have an inner surface, an outer surface and a pair of facing side edges. Each side edge is provided with connecting profiles, wherein connected profiles have facing surfaces, adjacent the connecting joint, and remote surfaces, adjacent the respective body module edges. Side surfaces on the profiles are substantially parallel to the inner and/or outer surfaces of the body modules. The above terminology and the description of the relative locations of components in a connecting joint between two body modules will be adhered to in the text below.

According to a preferred embodiment, the invention relates to a vehicle body module connecting joint for connecting a first body module to a second body module. The vehicle body module connecting joint is particularly useful for connecting a first body module on a first vehicle module to a second body module on a second vehicle module, during assembly of a vehicle comprising multiple connected vehicle modules. In the subsequent text, the vehicle body module connecting joint will be referred to as a "connecting joint".

The inventive connecting joint comprises elongate profiles arranged along facing edges of the first and second body modules, respectively. The profiles are provided with shaped sections commonly referred to as "dovetails", which sections have their widest cross-sectional dimension facing into the joint. A dovetail joint is also referred to as a swallow-tail joint or a fantail joint. The adjacent profiles are clamped together by locking wedges arranged parallel to the profiles, matching the shape of the dovetail sections. The body modules will inherently have an inner surface and an outer surface, whereby the locking wedges will be arranged along the dovetail sections of said profiles on opposite sides of the inner and outer surfaces of the respective body modules. The locking wedges are connected by fastening means extending between facing profiles on said edges of the first and second body modules.

According to one example, the connecting joint comprises a first profile arranged along a side edge of the first body module along a surface remote from the connecting joint and a second profile arranged parallel to and in form-fitting contact with the first profile along facing side surfaces; wherein the assembled first and second profiles forming a single, common first dovetail section along a surface facing the connecting joint. In order to achieve this, the first and second profiles are assembled side-by-side and have form-fitting sections facing into the joint which sections are interlocking and shaped to form a single dovetail after assembly of the first and second profiles.

At least one third profile is arranged along a side edge of the second body module along a surface of the third profile remote from the connecting joint. The third profile has a dovetail section along an opposite side surface facing the connecting joint. The dovetail section on the third profile forms a second dovetail section along a surface facing the first and second profiles and their common, first dovetail section.

When two vehicle modules are placed end to end, the dovetail sections of the respective profiles on the first and second body modules are placed in close proximity to each other, separated by a predetermined distance. The locking wedges are then arranged to engage with the first and second dovetail sections on opposite sides of the first and second body modules. A first locking wedge can be placed in contact with adjacent dovetail sections along the inner surfaces of the first and second body modules, while a second locking wedge can be placed in contact with adjacent dovetail sections along the outer surfaces of the first and second body modules. Multiple fasteners are then used for clamping the first and second locking wedges together, thereby clamping and assembling the first and second body modules into a desired relative position.

In the above example, the first body module is described as being provided with two assembled profiles comprising a common first dovetail section, and the second body module is described as being provided with a single profile comprising a single, second dovetail section. Within the scope of the invention, it is possible to provide both body modules with assembled profiles having a common dovetail section.

According to a further example, the first profile can comprise a separate dovetail section forming part of the first dovetail section. In this way, a profile having a relatively narrower, separate dovetail section can be used as a part of a standardized system of interchangeable profiles. Such profiles can be used when assembling modular components that are not part of a connecting joint between vehicle modules.

This feature makes the first profile exchangeable to accommodate at least one alternative first body module, while the second profile is retained. This arrangement can be made possible by, for instance, providing the second profile with one half of the first dovetail section and a projection that can be interlocked with a portion of the separate dovetail section on the first profile. The separate dovetail section on the first profile and the projection along the second profile are made form-fitting so that the assembled first and second profiles behave as a single profile under load.

Each profile making up a part of the connecting joint can be considered to be a structural component, supporting at least a portion of a component forming a side wall, a window, a roof or a floor section. Provided with one or more profiles along a side edge, the component forms a body module which in turn will form part of a vehicle module. In some cases, the body module comprises a feature that requires additional structural support, for instance a door frame or similar. The added structural support is provided by a second profile forming a reinforcing joint member.

The second profile is attachable to structural members of the vehicle module at its ends. According to one example, the second profile has a longitudinal extension that is substantially equal to the longitudinal extension of the first profile. According to an alternative example, the second profile has a longitudinal extension exceeding the longitudinal extension of the first profile at one or both ends. In the latter example, the end or ends of the second profile can be attached to a suitable structural member of the vehicle module, such as a longitudinal structural beam. This is particularly useful if the second profile is a reinforcing joint member. Such longitudinal structural beams can be provided along the upper and lower corners of a vehicle module, in the longitudinal direction of a subsequently assembled vehicle.

A vehicle can be assembled in several different ways. A preferred sequence is to assemble body modules comprising a roof, a floor and side walls into a vehicle module. The vehicle module can then be assembled with a front vehicle module, such as a driver's cab module, and a rear vehicle module, such as a drive module, to form a complete vehicle. If an extended vehicle is required, then the vehicle module can be assembled with an adjacent intermediate vehicle module, prior to adding a front driver's cab module and a rear drive module. The driver's cab module can comprise all the necessary equipment and instrumentation for driving the vehicle. The drive module can be provided with an internal combustion engine, an electric motor, or a similar suitable propulsion unit. Depending on the type of vehicle, the drive module need not necessarily be located at the rear of the assembled vehicle. The inventive connecting joints are used for connecting at least the side walls of adjacent vehicle modules. In addition, the connecting joints can also be applied to connect floor sections and roof sections of adjacent vehicle modules.

The profiles described above are preferably, but not necessarily, extruded profiles comprising at least one hollow cavity. The profiles can be extruded using a suitable metal, such as aluminium or an aluminium alloy, although other materials, such as plastics, can be considered. The choice of suitable materials is made depending on the intended use and the expected loading on the profiles.

According to the invention, a connecting joint comprises a first locking wedge arranged to engage with adjacent dovetail sections on the first and the third profile. Similarly, a second locking wedge is arranged to engage with dovetail sections on the second and the third profile. The first and second locking wedges are arranged on opposite sides of the respective first and second body modules. After assembly, a locking wedge on at least one side of the connecting joint is arranged to clamp adjacent profiles together and into contact with opposing longitudinal side surfaces on the locking wedge, in order to provide a flush connection between adjacent body modules. Depending on whether the connecting joint is visible from the inside and/or the outside of the assembled unit, the locking wedges can be arranged to be flush with the body modules on one or both sides thereof.

A feature of this connecting joint is that the wedges are not arranged to draw the dovetail sections of the respective body module into contact with each other. Instead, end surfaces on the respective profile from which the dovetail sections extend are drawn into contact with facing side surface on the respective locking wedge. When clamped together, compressive and tensile forces in the plane of the body modules at right angles to the connecting joint are transferred through the locking wedges, instead of the dovetail sections. Bending moments through the connecting joint parallel to the profiles is taken up by the locking wedges and the multiple fasteners clamping them together. The connecting joint is preferably, but not necessarily, clamped together by multiple pre-loaded fastening means.

By assembling a connecting joint according to the invention using multiple profiles, as described above, the distance between the locking wedges allow the fasteners to be pre-loaded or pre-tensioned. The pre-load of a fastener, is created when a torque is applied to develop a tensile preload that is generally a substantial percentage of the fastener's proof strength. Fasteners are manufactured to various standards that define, among other things, their strength. Torque charts are available to specify the required torque for a given fastener based on its property class and grade, or tensile strength. When a fastener is torqued, a tension pre-load develops in the fastener and an equal compressive preload develops in the locking wedges being fastened. This can be modeled as a spring-like assembly that has some assumed distribution of compressive strain in the clamped joint components. When an external tension load is applied, it relieves the compressive strains induced by the preload in the clamped components, hence the preload acting on the compressed joint components provides the external tension load with a path through the joint other than through the fastener. In a well-designed joint, perhaps 80-90% of the externally applied tension load will pass through the joint and the remainder through the fastener. This reduces the fatigue loading of the fastener and can improve the durability of the fastener when subjected to repeated tension loads. Maintaining a sufficient joint pre-load also prevents relative slippage of the joint components, which could produce wear that could result in a fatigue failure of the component parts. If a bolt and nut fastener is used, either the bolt head or the nut can be torqued. If one has a larger bearing area or coefficient of friction it will require more torque to provide the same target preload. Fasteners should only be torqued if they are fitted in clearance holes.

In order to avoid using a nut on one side of the assembly, one of the locking wedges can comprise blind holes for fastening means. In this way, the locking wedge provides a flush surface without through hole on one side of the assembly. In this case the fastening means can be screws, preferably of the Allen or Torx type to provide a flush surface on both sides of the assembly. In order to allow a sufficient pre-load to be applied to the fastening means it should preferably have a minimum length of 40 mm.

The invention further relates to a vehicle comprises vehicle body modules assembled by means of connecting joints according to the above description.

In the production of passenger transport vehicles or commercial vehicles in general there is a desire to produce several versions of such vehicle based on the same basic layout. The different versions can have different lengths, passenger capacity and/or load-carrying capacity. Typical examples of such vehicles are buses of an original single-unit structure based on chassis units of trucks. However, the principle is also applicable to trucks, for instance when assembling different sizes of drivers cabs or load carrying compartments. The connecting joint according to the invention is particularly advantageous for this application.

A connecting joint according to the invention comprises exchangeable profiles, which allows the same connecting joint to be applied to any number of body module combinations. In the above-mentioned text, the first profile is provided with an individual dovetail section. This allows the profile to be used in conventional connecting joints, as well as in the inventive joint described above. This provides a modular system that eliminates the need for manufacturing special profiles for each joint. A wall panel or similar comprising a standard profile can thereby form part of the body module without requiring any modifications.

The provision of a connecting joint in which one of the profiles is also a reinforcing joint member allows the joint to form part of the load supporting structure of the vehicle, in addition to forming a joint between two body modules. In the above-mentioned text, the second profile is a reinforcing joint member provided with a shaped projection that mates with a dovetail section on an adjacent profile to form a common dovetail section. According to the invention, the provision of a reinforcing profile in at least one of the body modules to be joined results in a stronger connecting joint. The reinforced connecting joint can be used for longer body modules and/or to provide added strength where one of the body modules to be joined comprises a component such as a door. A further advantage is that the use of multiple profiles provides a connecting joint that has a transverse dimension allowing longer fasteners to be used, which fasteners can be pre-loaded. Such a pre-load acting on the compressed joint components provides external tension loads with a path through the joint other than through the fastener, thus reducing the fatigue loading on the fastener. Pre-loading also improves the durability of the fastener under repeated loading, which is a common loading case in vehicles.

BRIEF DESCRIPTION OF DRAWINGS

In the following text, the invention will be described in detail with reference to the attached drawings. These schematic drawings are used for illustration only and do not in any way limit the scope of the invention. In the drawings.

DETAILED DESCRIPTION

Figure 1:
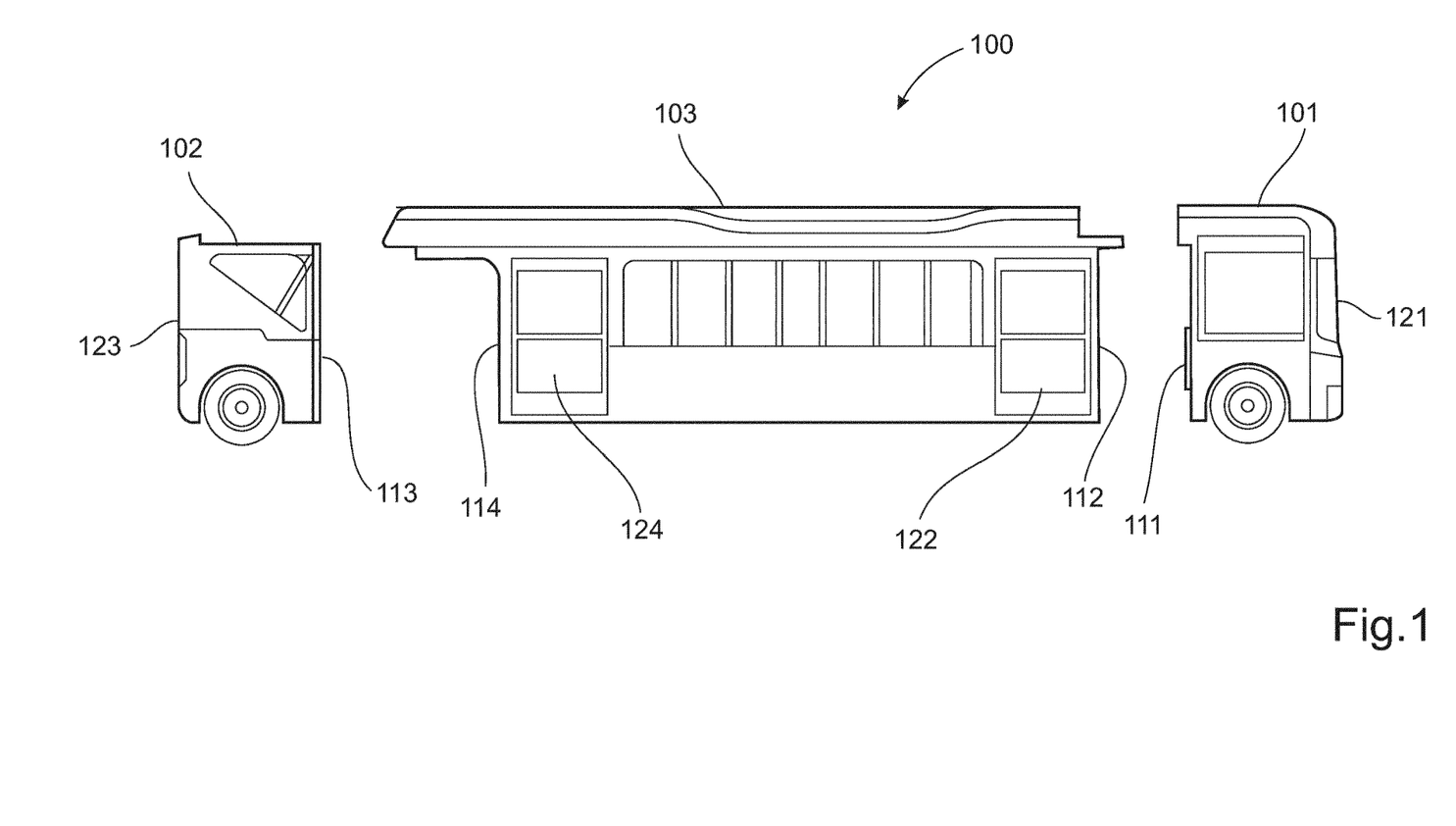
FIG. 1 shows a schematically illustrated vehicle comprising multiple body modules with connecting joints according to the invention.

FIG. 1 shows a schematically illustrated vehicle 100 to be assembled using connecting joints according to the invention. The vehicle 100 in this example will comprise a front vehicle module 101, such as a driver's cab module 121, a rear vehicle module 102, such as a drive module 123 comprising a propulsion unit, and an intermediate vehicle module 103, such as a passenger module having windows and doors 122, 124, to form a complete vehicle 100.

Facing side edges 111, 112 on the front vehicle module 101 and the front portion of the intermediate vehicle module 103, respectively, are provided with connection joints according to the invention. Similarly, facing side edges 113, 114 on the rear vehicle module 102 and the rear portion of the intermediate vehicle module 103, respectively, are provided with such connection joints. As will be described below, such connecting joints can also be applied to connect floor sections and roof sections of adjacent vehicle modules.

Figure 2:
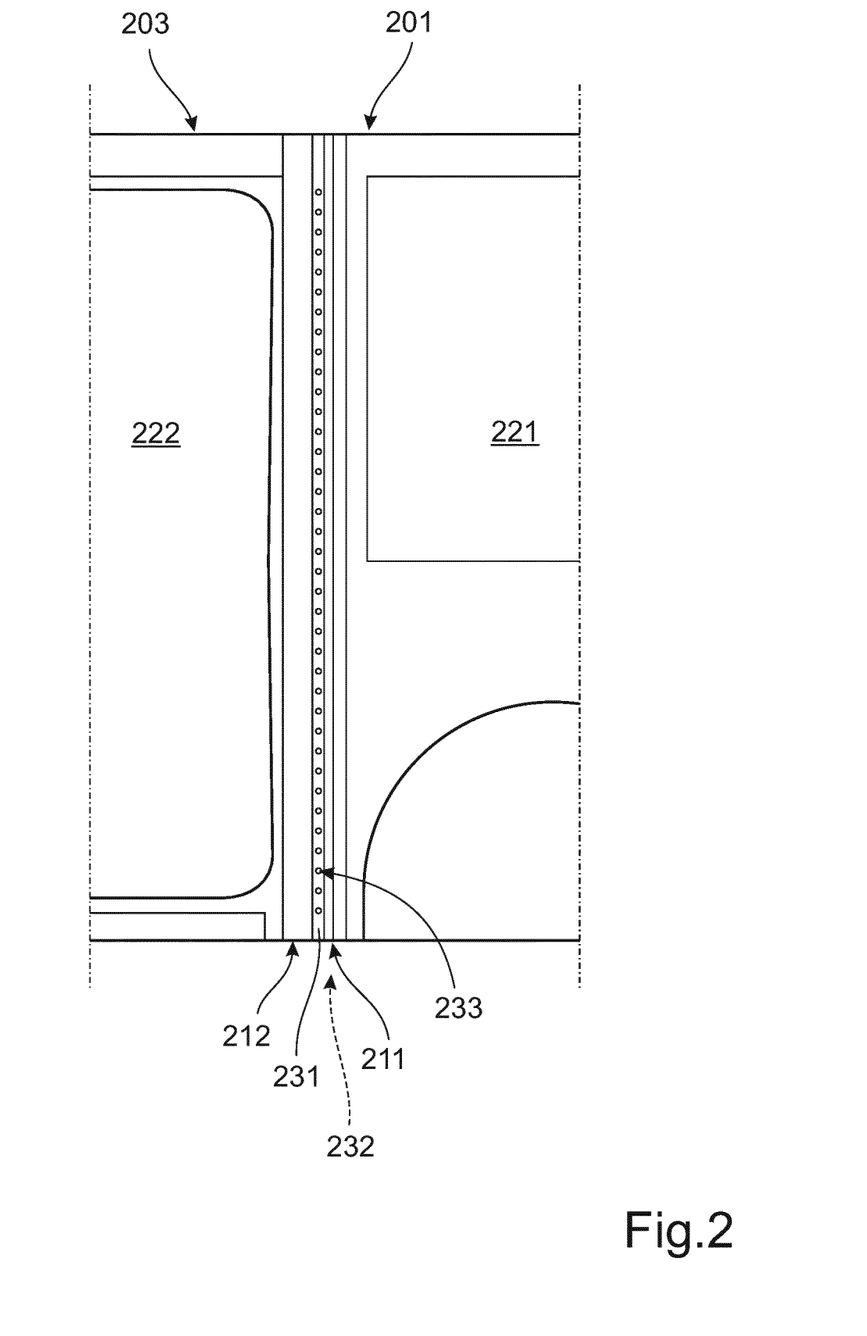
FIG. 2 shows a schematic enlarged side view of a connecting joint used in a vehicle as indicated in FIG. 1.

FIG. 2 shows a schematic enlarged side view of a connecting joint 211, 212, 231 between a front vehicle module 201 and an intermediate vehicle module 203. The connection joint comprises an elongated profile 211 attached to a side body module 221 of the front vehicle module 201 and an elongated profile assembly 212 attached to a side body module 222 of the intermediate vehicle module 203. The profile 211 and the profile assembly 212 are clamped together by locking wedges 231, 232 (only the outer wedge shown) arranged parallel to the profiles and connected by multiple fastening means 233 extending between the facing profiles 211, 212 on the front and intermediate body modules 221, 222, respectively. In this example, the fastening means 233 are inserted through the outer locking wedge 231 and fastened from the outside of the vehicle modules 201, 203. Alternatively, the fastening means can be inserted through the inner locking wedge 232 and be fastened from the inside. The figure shows an example of a connecting joint after assembly of a vehicle as illustrated in FIG. 1. The connecting joint shown in FIG. 2 will be described in further detail in FIGS. 4-6 below.

Figure 3:
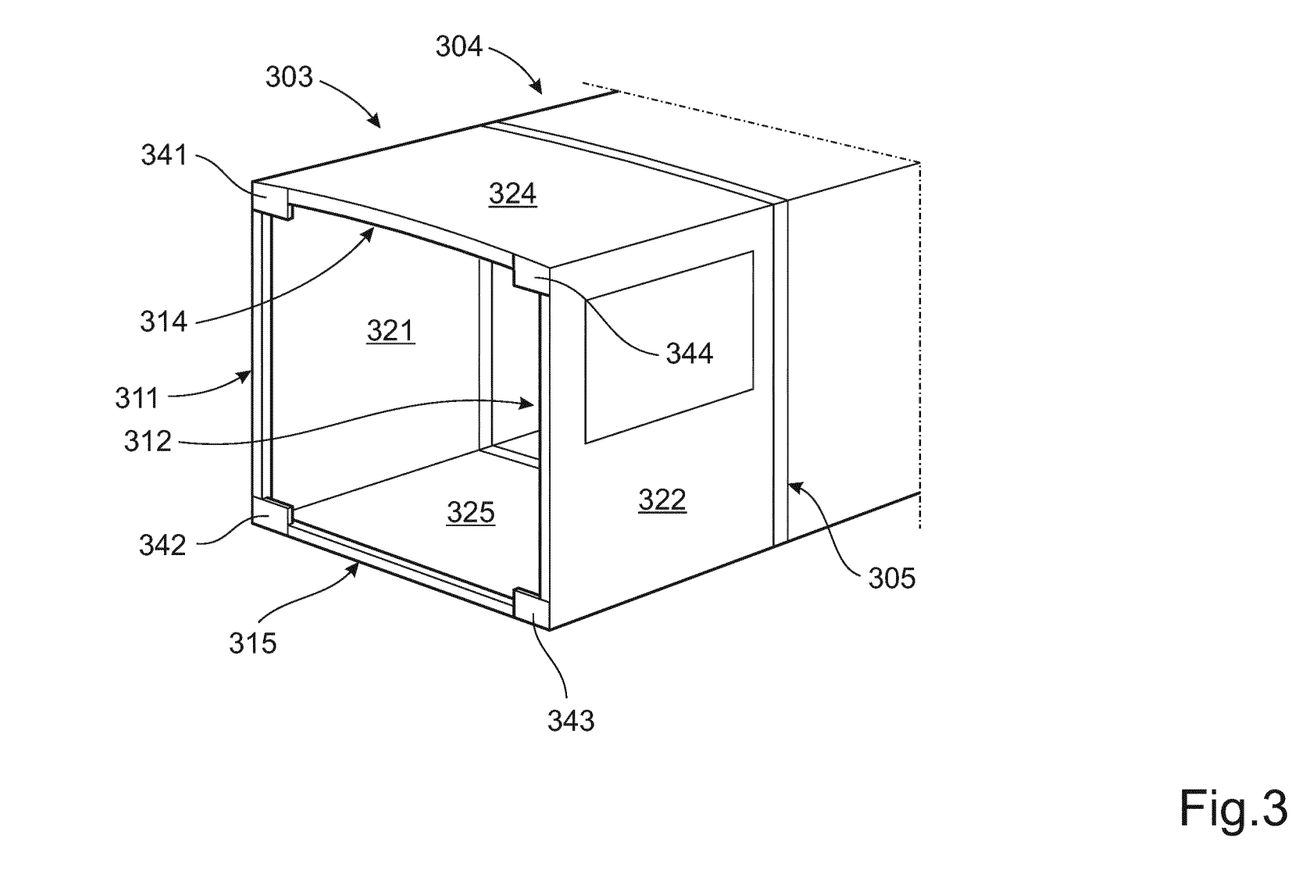
FIG. 3 shows a schematic perspective view of a vehicle module.

FIG. 3 shows a schematic perspective view of a vehicle module comprising body modules provided with connecting joints according to the invention. The figure shows a schematic first intermediate vehicle module 303 that has been assembled with a second intermediated vehicle module 304. The first and second intermediate vehicle modules 303, 304 have been connected by a connecting joint 305 according to the invention.

The first vehicle module 303 comprises four body modules, including a first and a second side wall module 321, 322, a roof module 324 and a floor module 325. The body modules 321, 322, 324, 325 are connected to structural members 341, 342, 343, 344 of the vehicle module, in this case longitudinal structural beams extending along the upper and lower corners of the first vehicle module 303, in the longitudinal direction of a subsequently assembled vehicle. The body modules are attached to the beams at least at their respective front and rear corners, preferably by means of the ends of the elongated profiles making up the connecting joints. For instance, the first side wall module 321 is provided with an elongated profile 311 at its free end. This profile 311 is attached to an upper structural member 341 at its upper end and to a lower structural member 342 at its lower end. Similarly, the opposite side wall module 322 comprises an identical profile 312 at its free end. This profile 312 is attached to an upper structural member 344 at its upper end and to a lower structural member 343 at its lower end. In the same way, the roof module 324 is attached between the upper structural members 341, 344, while the floor module 325 is attached between the lower structural members 342, 343. If required, each respective body module can be provided with additional fastening means along their respective longitudinal structural member or beam intermediate the connecting joints.

The free end of the first vehicle module 303 can be connected to a further intermediate vehicle module, or to a front or rear vehicle module. For this purpose the body modules 321, 322, 324, 325 or first vehicle module 303 are provided with individual profiles 311, 312, 313, 314 arranged to be clamped together with corresponding, facing profiles located on the next vehicle module (not shown), using locking wedges. Examples of cooperating profiles and locking wedges will be given below.

Figure 4A:
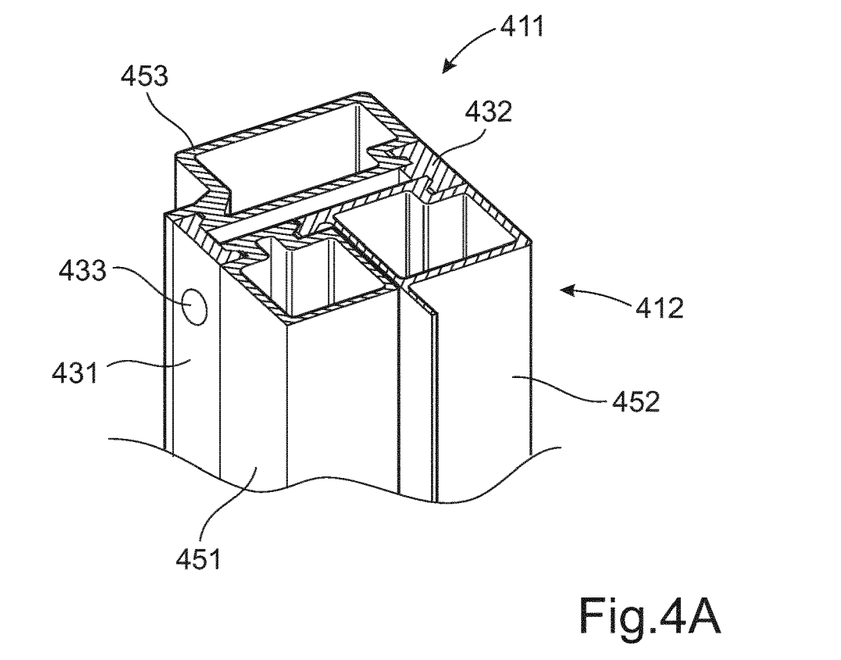
FIGS. 4A-B show a perspective and a plan view of a cross-section through a connection joint according to the invention.
Figure 4B:
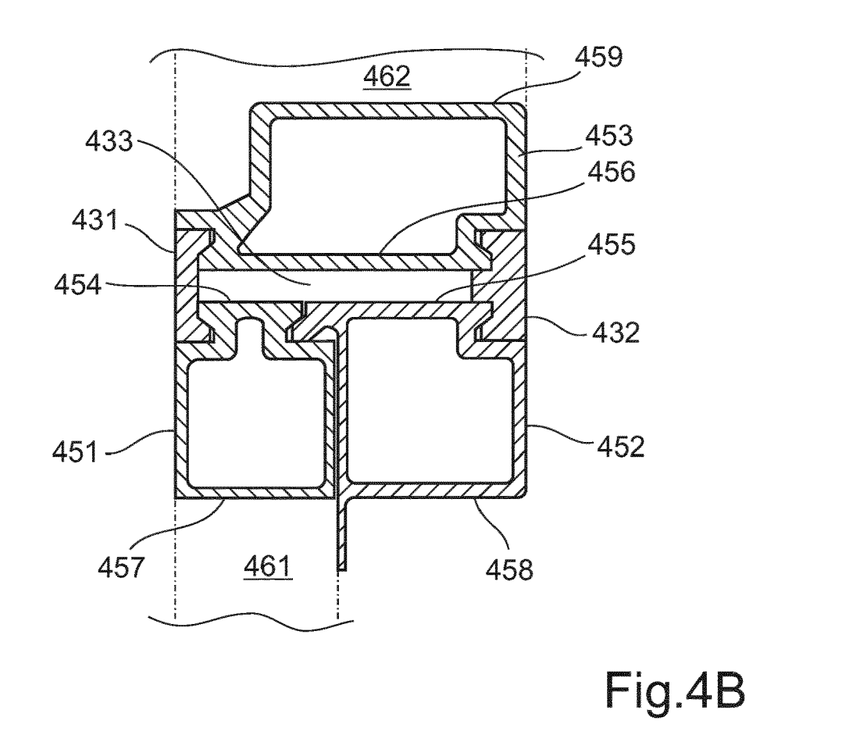

FIGS. 4A-4B show a perspective and a plan view of a cross-section through a connection joint 411 according to the invention. According to this example, the connecting joint 411 comprises a first profile 451 arranged along a side edge of the first body module 461 along a surface 457 remote from the connecting joint 411 and a second profile 452 arranged parallel to and in form-fitting contact with the first profile 451 along facing side surfaces. The assembled first and second profiles 451, 452 each comprise individual projections 454, 455, respectively, which when assembled form a single, common first dovetail section 454, 455 facing into the connecting joint 411. In order to achieve this, the first and second profiles 451, 452 are assembled side-by-side and have projections 454, 455 with form-fitting sections facing into the connecting joint. Adjacent portions of the projections 454, 454 are interlocking and shaped to form the single dovetail after assembly of the first and second profiles 451, 452.

FIG. 4B also shows a third profile 453 arranged along a side edge of a second body module 462 along a surface 459 of the third profile 453 remote from the connecting joint 411. The third profile 453 has a dovetail section 456 along an opposite side surface of the profile facing into the connecting joint 411. The dovetail section on the third profile 453 forms a second dovetail section 456 along a surface facing the first and second profiles 451, 452 and their common, first dovetail section 454, 455.

Figure 5A:
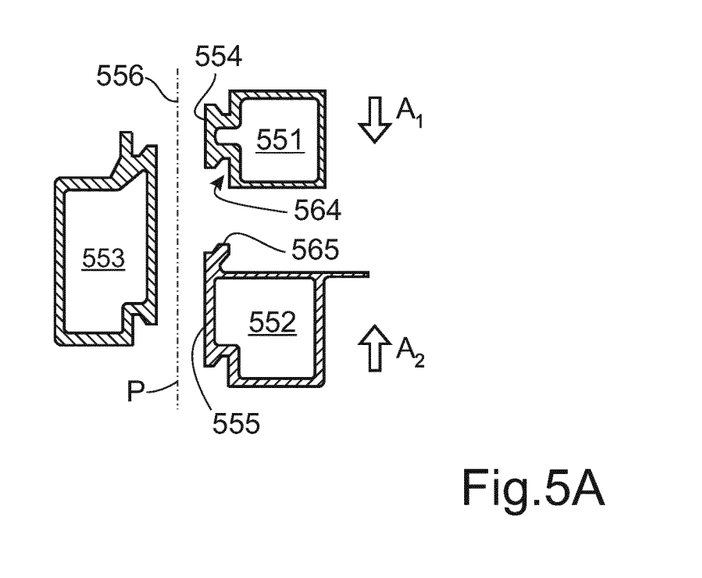
FIGS. 5A-C show an assembly process for a connection joint according to the invention.

When two vehicle modules are placed end to end, the dovetail sections 454, 455, 456 of the respective profiles 451, 452, 453 on the first and second body modules 461, 462 are placed in close proximity to each other, separated by a predetermined distance D (see FIG. 5A). Locking wedges 431, 432 are then arranged to engage with the first and second dovetail sections 454, 455, 456 on opposite sides of the first and second body modules 461, 462. A first locking wedge 431 is placed in contact with adjacent dovetail sections 454, 456 along the inner surfaces of the first and second body modules 461, 462, while a second locking wedge 432 is placed in contact with adjacent dovetail sections 455, 456 along the outer surfaces of the first and second body modules 461, 462. Multiple fasteners 433 are then used for clamping the first and second locking wedges 431, 432 together, thereby clamping and assembling the first and second body modules 461, 462 into a desired relative position. The predetermined distance D between the facing dovetail sections 454, 455, 456 must be larger than the dimensions d of the fasteners 433 inserted there between (see FIG. 5A).

In the example shown in FIGS. 4A-4B, the first body module 461 is described as being provided with two assembled profiles 451, 452 comprising a common first dovetail section, and the second body module 462 is described as being provided with a single profile 453 comprising a single, second dovetail section 456. Within the scope of the invention, it is possible to provide both body modules with assembled profiles having a common dovetail section.

As indicated in FIGS. 4A-4B, the first profile 451 can comprise a separate dovetail section 454 forming part of the first dovetail section 454, 455. In this way, the first profile 451 has a relatively narrower dimension with a separate dovetail section 454 that can be used as a part of a standardized system of interchangeable profiles. Such profiles can be used when assembling modular components that are not part of a connecting joint between vehicle modules.

This feature makes the first profile exchangeable to accommodate at least one alternative first body module, while the second profile is retained. This arrangement can be made possible by, for instance, providing the second profile with one half of the first dovetail section and a projection that can be interlocked with a portion of the separate dovetail section on the first profile. The separate dovetail section on the first profile and the projection along the second profile are made form-fitting so that the assembled first and second profiles behave as a single profile under load.

Figure 5B:
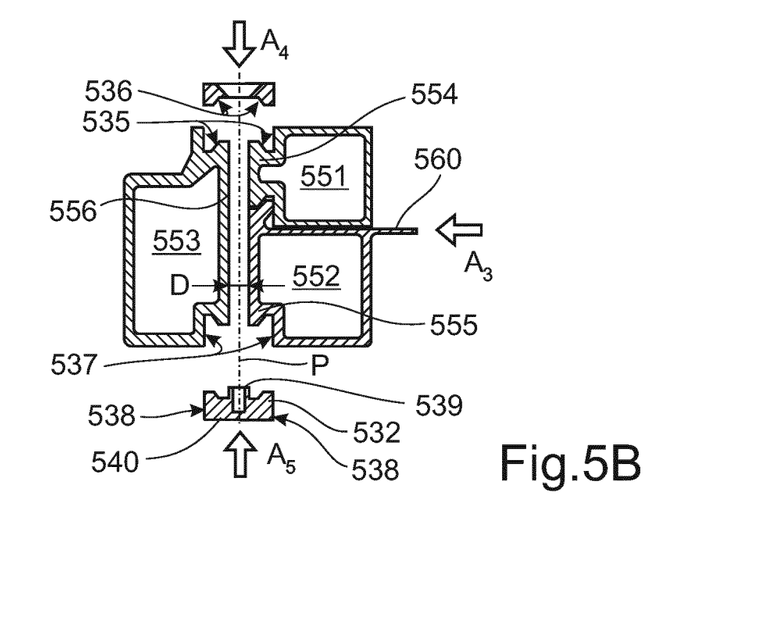
Figure 5C:
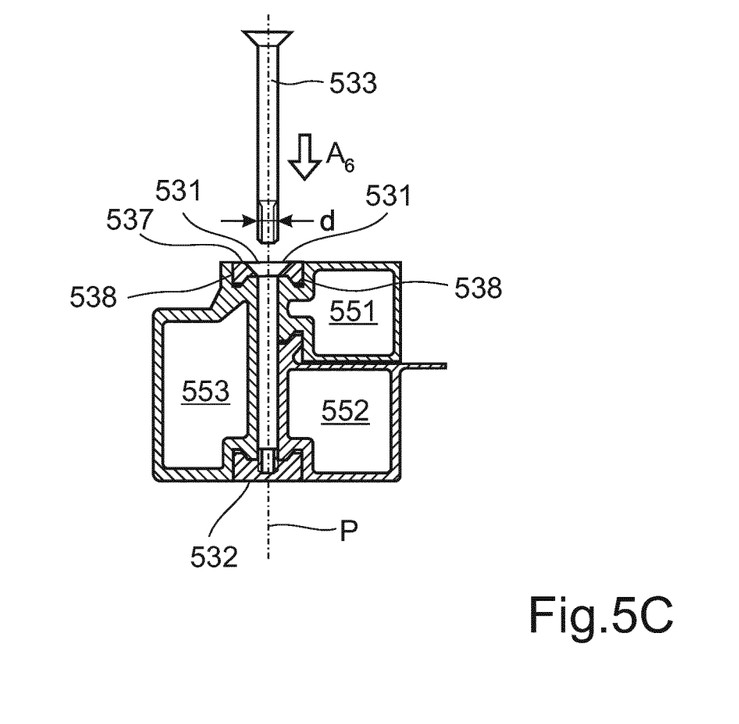

FIG. 5A-5C shows an assembly process for a connection joint according to the invention. In a first step, shown in FIG. 5A, a first profile 551 comprising a first projection 554 and a second profile 552 comprising a second projection 555 are brought into contact with each other, as indicated by the arrows A1 and A2. The first profile 551 is also attached to a first body module (not shown). In this example, the first projection 454 on the first profile forms an individual dovetail. The first and second projections 454, 455 have form-fitting sections 564, 565 facing into the connecting joint. On the first profile 551, the form-fitting section 564 is a recess on one side of the dovetail-shaped first projection 554. On the second profile 552, the form-fitting section 565 is an inverse dovetail-shaped projection 565 having a complementary shape to the recess 564 of the first projection 554. When the first and second profiles 551, 552 have been assembled, the first and second projections 554, 555 form a common first dovetail, as shown in FIG. 5B. At the same time, a third profile 553 comprising a second dovetail 556 and being attached to a second body module (not shown) is clamped into position relative to a plane P at right angles to the profile and a main plane of the associated body module.

In a second step, shown in FIG. 5B, the first and second profiles 551, 552 have been assembled and moved into position relative to the plane P, as indicated by the arrow A3, prior to assembly with the third profile 553. The first and second profiles 551, 552 can be assembled using suitable fasteners (not shown). In this example, the second profile 552 can also be attached to a first body module using a flange 460 extending away from the connecting joint. The first, second and third profiles 551, 552, 553 are held in a fixed in position relative to the plane P, separated by a predetermined distance D.

Locking wedges 531, 532 are then moved into contact with the first and second dovetail sections 554, 555, 556 on opposite sides thereof, as indicated by the arrows A4 and A5.

A first locking wedge 531 is placed in contact with adjacent dovetail sections 554, 556 along one side of the first and second body modules, while a second locking wedge 532 is placed in contact with adjacent dovetail sections 554, 556 along the opposite side of the first and second body modules (see FIG. 4B). When brought into contact with the profiles, diverging contact surfaces 536 on the first locking wedge 531 cooperate with converging contact surfaces 535 formed on the first and second dovetail sections 555, 556. The second locking wedge 532 is arranged to cooperate with the first and second dovetail sections 555, 556 in the same manner.

The diverging contact surfaces 536 on the locking wedges 531, 532 and the converging contact surfaces 535 on the respective dovetail sections 554, 555, 556, serve to position the locking wedges exactly and to ensure that the dovetail sections 554, 555 on the first and second profiles 551, 552 are maintained at the predetermined distance D from the facing dovetail section 556 on the third profile 553. As the facing locking wedges 531, 532 are displaced into contact with the profiles, the cooperating diverging contact surfaces 536 and converging contact surfaces 535 will attempt to draw the body modules and their respective profiles together and displace them towards the central plane P through the connecting joint. However, this displacement is prevented by the locking wedges in order to maintain the predetermined separation distance D. With reference to the second locking wedge 532, opposing side surfaces 538 on the locking wedge 532 parallel to the plane P will come into contact with corresponding facing side surfaces 537 on either side of the dovetail sections 554, 555, 556, as shown in FIG. 5C. The second locking wedge 532 in FIG. 5C is provided with a central raised ridge 539 that can be inserted into the gap between the facing dovetail sections. The ridge 539 is provided with threaded blind holes 540 (see FIG. 5B) for cooperation with threaded fasteners 533. The threaded fasteners have a diameter that is less than the separation distance D between the dovetail sections.

Figure 5D:
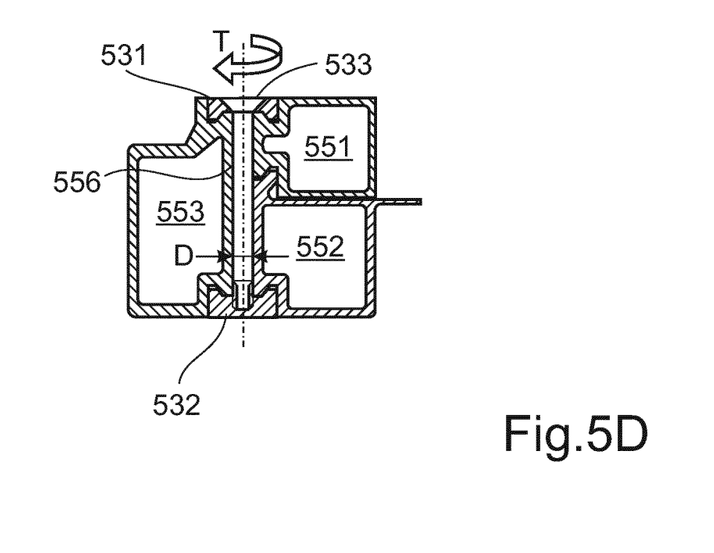

FIG. 5D shows an assembled connecting joint where the first, second and third profiles 551, 552, 553 are clamped together by the locking wedges 531, 532 and the fastener 533. The fastener 533 is pre-loaded by applying a predetermined torque, indicated by the arrow T. A feature of this connecting joint is that the locking wedges 531, 532 are not arranged to draw the first and second dovetail sections 554, 555, 556 of the respective body module into contact with each other. Instead, end surfaces 537 (see FIG. 5B) on the respective profile 551, 552, 553 from which the dovetail sections 554, 555, 556 extend are drawn into contact with respective facing side surfaces 538 on the respective locking wedge 531, 532. When clamped together, compressive and tensile forces in the plane of the body modules at right angles to the plane P through the connecting joint are transferred through the locking wedges 531, 532, instead of the dovetail sections 554, 555, 556. Bending moments through the connecting joint parallel to the profiles is taken up by the locking wedges and the multiple fasteners clamping them together. The connecting joint is preferably, but not necessarily, clamped together by multiple pre-loaded fastening means. As stated above, the respective body module attached to the respective profile/profiles is not shown in FIGS. 5A-5C.

Figure 6:
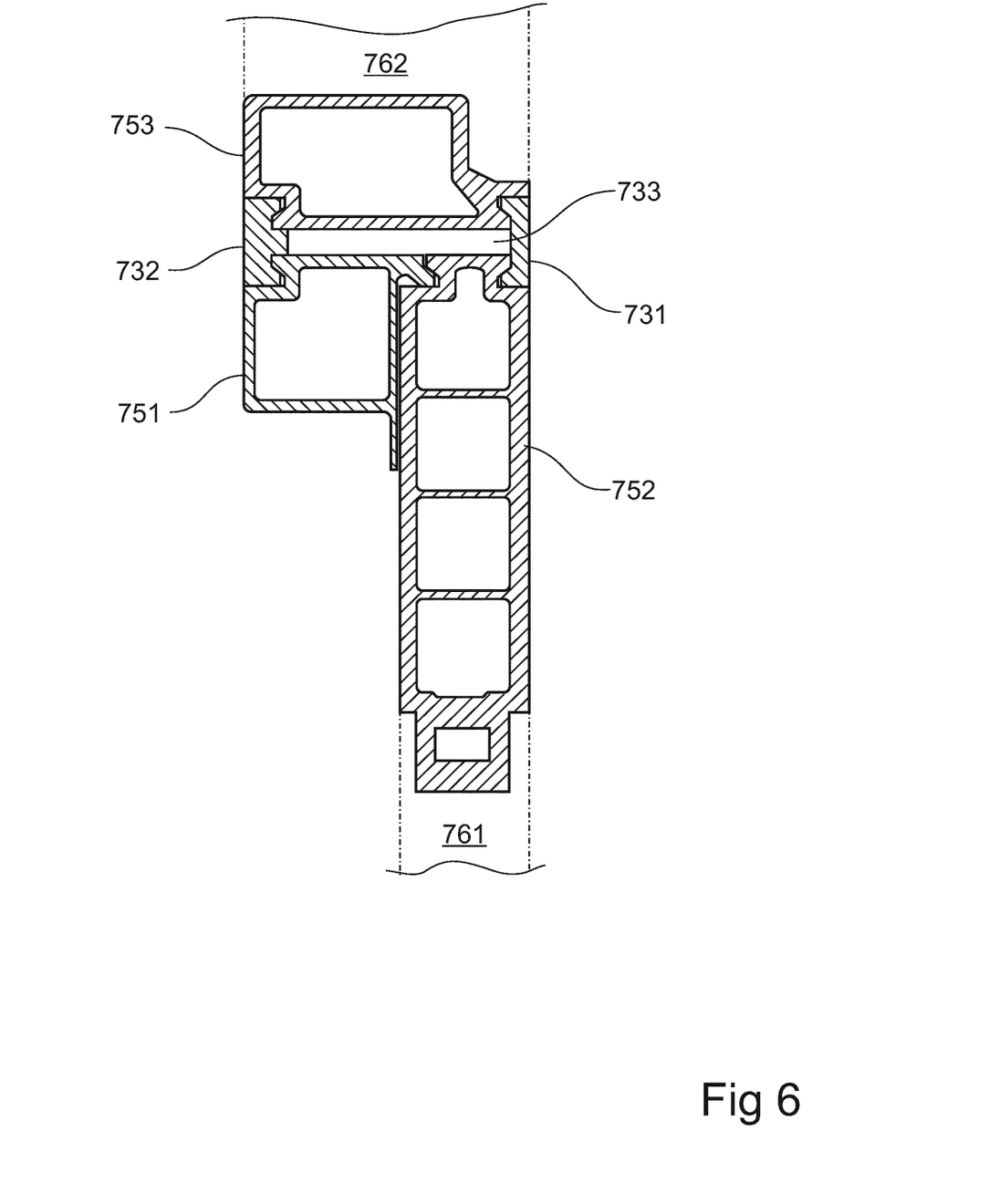
FIG. 6 shows an alternative connecting joint according to the invention.

FIG. 6 shows an alternative connection joint according to the invention. In FIG. 6, a first profile 751 and a second profile 752 attached to a first body module 761 is attached to a third profile 753 connected to a second body module 762. The connecting joint is assembled using a first and a second locking wedge 731, 732 clamped together by means of multiple pre-loaded fasteners 733 extending at right angles to the extension of the profiles and to the main plane of the first and second body modules, respectively. FIG. 6 indicates that the connecting joint can be used with different exchangeable profiles and body modules.

The invention should not be deemed to be limited to the embodiments described above, but rather a number of further variants and modifications are conceivable within the scope of the following patent claims.

The invention claimed is:

1. A vehicle, comprising: a first body module and a second body module;
   a vehicle body module connecting joint for connecting the first body module to the second body module, which connecting joint comprises elongate profiles arranged along facing edges of the first and second body modules, respectively, wherein the profiles are clamped together by locking wedges arranged parallel to the profiles and connected by fastening means extending between facing profiles on the first and second body modules; wherein the vehicle further comprises: a first profile arranged along a side edge of a first body module along a surface remote from the connecting joint; a second profile arranged parallel to and in form-fitting contact with the first profile along facing side surfaces; wherein the assembled first and second profiles forming a single first dovetail section along a surface facing the connecting joint; and at least one third profile arranged along a side edge of a second body module along a surface remote from the connecting joint and having a second dovetail section along a surface facing the first and second profiles; wherein the locking wedges are arranged to engage with the first and second dovetail sections on opposite sides of the first and second body modules, wherein end surfaces on the respective profile from which the first and second dovetail sections extend are drawn into contact with respective facing side surfaces on the respective locking wedge.

2. Vehicle according to claim 1, wherein the first profile comprises a separate dovetail section forming part of the first dovetail section.

3. Vehicle according to claim 1, wherein the first profile is exchangeable to accommodate at least one alternative first body module.

4. Vehicle according to claim 1, wherein the second profile comprises one half of the first dovetail section and a projection interlockable with a portion of the separate dovetail section on the first profile.

5. Vehicle according to claim 1, wherein the second profile is a reinforcing joint member.

6. Vehicle according to claim 1, wherein the second profile is attachable to structural members at its ends.

7. Vehicle according to claim 6, wherein the second profile has a longitudinal extension exceeding the longitudinal extension of the first profile at both ends.

8. Vehicle according to claim 1, wherein the third profile comprises a single profile.

9. Vehicle according to claim 1, wherein third profile comprises two assembled profiles.

10. Vehicle according to claim 1, wherein the profiles are extruded profiles comprising at least one hollow cavity.

11. Vehicle according to claim 1, wherein a first of the locking wedges is arranged to engage with adjacent dovetail sections on the first and the third profile; and a second of the locking wedges is arranged to engage with dovetail sections on the second and the third profile.

12. Vehicle according to claim 1, wherein the locking wedge on at least one side of the connecting joint is arranged to clamp adjacent profiles together and into contact with opposing longitudinal side surfaces on the locking wedge, in order to provide a flush connection between adjacent body modules.

13. Vehicle according to claim 1, wherein the connecting joint is held together by multiple pre-loaded fastening means.

14. Vehicle according to claim 1, wherein one locking wedge comprises blind holes for the fastening means.

15. Vehicle according to claim 1, wherein the fastening means are screws.

16. Vehicle according to claim 15, wherein the fastening means have a minimum length of 40 mm.

* * * * *